Oct. 28, 1952
A. C. DE MELLO
2,615,275
FISHHOOK HOLDER
Filed July 28, 1950
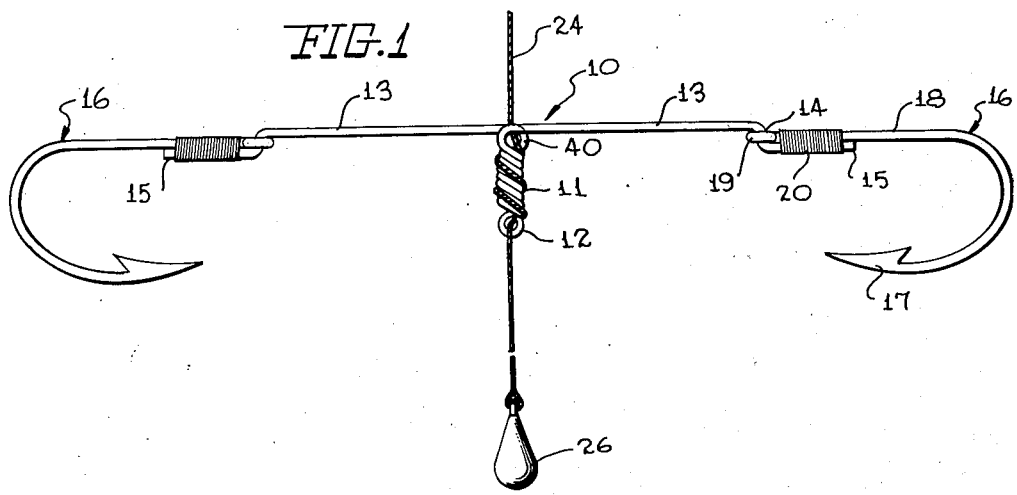
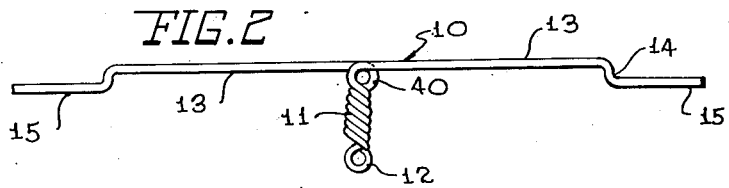
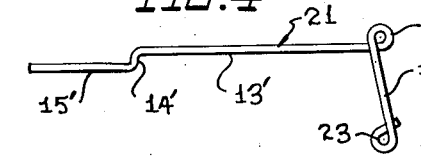
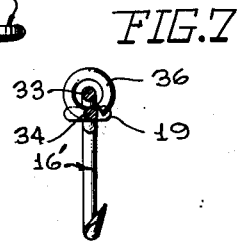
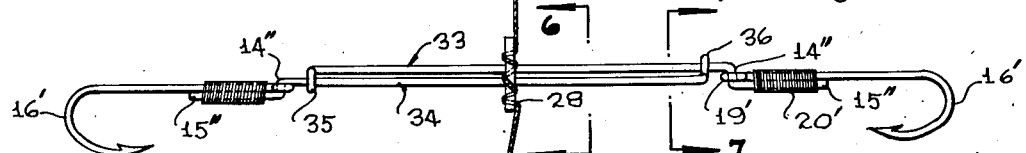
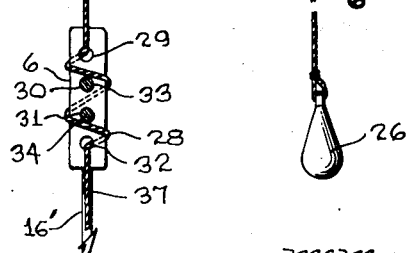
INVENTOR.
ALFRED C. DeMELLO
BY
McMorrow, Berman + Davidson
ATTORNEYS Patented Oct. 28, 1952

2,615,275

UNITED STATES PATENT OFFICE 2,615,275

FISHHOOK HOLDER

Alfred C. De Mello, New Bedford, Mass.

Application July 28, 1950, Serial No. 176,403

1 Claim. (Cl. 43—42.74)

The present invention relates to a holder for supporting fishhooks for attachment to a fish line.

An object of the present invention is to provide a holder for one or more fishhooks for supporting the hooks in spaced relation from the line to prevent snagging thereof.

Another object of the present invention is to provide a fishhook holder which is adjustable to vary the spacing of the fishhooks relative to each other, and to a fish line.

A further object is to provide an improved fishhook arrangement which is simple to manufacture and efficient in operation.

Other and further objects will appear as the description proceeds, and upon reference to the accompanying drawings, in which:

Figure 1 is an elevational view of one embodiment of a fishhook holder of the present invention, with hooks attached and a line and sinker applied thereto;

Figure 2 is an elevational view of the fishhook holder of Figure 1, without hooks;

Figure 3 is a fragmentary plan view of a portion of the fishhook holder with a hook attached thereto;

Figure 4 is an elevational view of a second embodiment of the fishhook holder of the present invention;

Figure 5 is an elevational view of a third embodiment of an adjustable fishhook holder, with hooks, line and sinker secured thereto;

Figure 6 is a sectional view taken on line 6—6 of Figure 5; and

Figure 7 is a sectional view taken on line 7—7 of Figure 5.

Referring more particularly to the drawings, wherein like reference numerals refer to like parts throughout, one embodiment of a fishhook holder of the present invention is designated by reference numeral 10, Figures 1 and 2. The holder is formed from a single length of wire and has end portions 15, 15, and a central portion the central portion having eyes 40 in abutting relation and straight portions 13, 13, in substantially the same plane. A stem 11 depends from the eyes 40 at substantially right angles to the straight portions 13, 13, and merges into an eye 12 at the other end thereof, whereby a fishing line may extend through the eyes 40 and eye 12 and the stem 11 and be spirally wound about the stem 11. As shown in Figure 1, a fishing line 24 is extended through the eyes 40 and the eye 12 and the stem 11 and is spirally wound about the stem. A sinker 26 is secured to one end of the fishing line 24 and the other end of the line extends to the fisherman.

The end portions 15, 15, are in the same plane and are connected to the central portion by shoulders 14, 14, whereby the shank of a fishhook may be secured to each end portion with the eye of the hook surrounding the corresponding shoulder. As shown in Figure 1, the shank 18 of the fishhook 16 carrying the usual barbed hook 17 is secured to each end portion 15 by means of a line or wire indicated by the numeral 20 wrapped around the shank and the end portion 15 with the eye 19 surrounding the corresponding shoulder 14.

Referring to Figure 4, it will be noted that the single wire 21 is formed with an end portion 15' and a central portion, the central portion having an eye 22 and a straight portion 13' in substantially the same plane. A stem 11' depends from the eye 22 at substantially a right angle to the straight portion 13' and merges into an eye 23 at the other end thereof. A fishhook may be attached in the same manner as in the previous embodiment. The eyes 22 and 23 may be so arranged that a line may be inserted by forcing a section of the line between straight portion 13' and stem 11', thereby avoiding the necessity of threading the line through the eyes. It will be understood that the line may be wrapped around stem 11' similarly to Figure 1, so the line need not be cut.

Referring to the embodiment shown in Figures 5 to 7, inclusive, a tie link 28 forms a stem and is provided with a series of holes 29, 30, 31 and 32. A pair of wire brace arms 33 and 34 arranged in spaced, parallel relation are slidably supported in adjacent holes 30, 31 of said tie link. A loop 35 is formed at one end of brace arm 33 and extends downwardly from brace arm 33 and is circumposed about brace arm 34. A similar loop 36 formed on one end of brace arm 34 extends upwardly from one end of brace arm 34 and is circumposed about brace arm 33. It will thus be seen that the brace arms 33 and 34 may be moved outwardly and inwardly, since the tie link allows the brace arms to slide therein, and the loops 35 and 36 allow sliding of the brace arms. Some friction between the parts retains the brace arms in adjusted position.

The hooks 16' are secured to the end portions 15'' of the brace arms 33 and 34 in the same manner as the embodiment shown in Figure 1, namely, as by a wire 20' wrapped around the shank and the end portion 15'' with the eye 19' surrounding the corresponding shoulder 14''. It will be noted that various sizes of hooks may be attached to the end portions of the brace arms without any modification thereof.

The line 37 is passed through hole 29 from one side of tie link 28, as shown in Figures 5 and 6, and wrapped around a tie link, and is then passed through hole 32. The passage of the line in this circuitous manner causes a binding action of the line on the tie link, and also serves to retain the fishhook holder in fixed position on the line 37. Other means of threading the line to the plate may be used, and more turns may be made to increase the friction. It will be seen that the position of the fishhook holder of the present invention can be adjusted on the line without the necessity of tying any knots therein, and the stem 11, 11' or 28 will normally be held in vertical position by the sinker 26, so the hooks 16 and 16' will extend downwardly and there will be little or no danger of snagging the line or snagging the hook on the bottom of the lake.

It will be understood that other modifications of the invention may be made within the terms of the appended claim.

Having thus described my invention, I claim:

A fishhook holder comprising a single length of wire having end and central portions, said central portion having eyes in abutting relation and straight portions in substantially the same plane, a stem depending from said eyes at substantially right angles to the straight portions and merging into an eye at the other end thereof, said end portions being in the same plane and connected to the central portion by shoulders whereby the shank of a hook may be secured to each end portion with the eye of the hook surrounding the corresponding shoulder and whereby a fishing line may extend through the eyes of the central portion and the stem and be spirally wound about the stem.

ALFRED C. DE MELLO.

REFERENCES CITED

The following references are of record in the file of this patent:

UNITED STATES PATENTS

| Number | Name | Date |
|---|---|---|
| 790,336 | Yoerger | May 23, 1905 |
| 1,251,810 | Oehler | Jan. 1, 1918 |
| 1,325,530 | Ore | Dec. 23, 1919 |
| 1,720,287 | Moore | July 9, 1929 |
| 1,782,010 | Meyer | Nov. 18, 1930 |
| 2,162,739 | Mindek, Jr. | June 20, 1939 |
| 2,234,588 | Cope | Mar. 11, 1941 |
| 2,274,131 | Edberg | Feb. 24, 1942 |